United States Patent [19]

Giraud

[11] 4,323,934
[45] Apr. 6, 1982

[54] DROPOUT COMPENSATION CIRCUITRY

[75] Inventor: Andre Giraud, Champigny sur Marne, France

[73] Assignee: Spin Physics, Inc., San Diego, Calif.

[21] Appl. No.: 134,403

[22] Filed: Mar. 27, 1980

[51] Int. Cl.³ .......................... G11B 15/12; G11B 5/02
[52] U.S. Cl. ......................................... 360/61; 360/27; 360/63
[58] Field of Search ..................... 360/27, 28, 61, 63; 179/100.4 ST, 1GM; 375/40; 455/52; 371/68

[56] References Cited

U.S. PATENT DOCUMENTS

| | | | |
|---|---|---|---|
| Re. 24,956 | 3/1961 | Johnson | 178/6.6 |
| 2,937,368 | 5/1960 | Newby | 340/174 |
| 2,996,576 | 8/1961 | Dolby | 178/6.6 |
| 3,005,189 | 10/1961 | O'Brien | 340/174.1 |
| 3,071,723 | 1/1963 | Gabor | 324/34 |
| 3,328,521 | 6/1967 | Moskovitz | 178/6.6 |
| 3,588,705 | 6/1971 | Palme | 325/348 |
| 3,843,573 | 10/1974 | Kosaka | 360/25 |
| 4,013,841 | 3/1977 | Ohkubo et al. | 179/100.4 ST |
| 4,030,128 | 6/1977 | Perret | 360/63 |
| 4,035,730 | 7/1977 | Clayton | 325/348 |
| 4,076,969 | 2/1978 | Sacks | 179/100.4 |
| 4,143,325 | 3/1979 | Kahn | 325/478 |
| 4,184,178 | 1/1980 | Rorrer et al. | 360/27 |

FOREIGN PATENT DOCUMENTS 52-28301  3/1977  Japan ..................................... 360/38

*Primary Examiner*—Vincent P. Canney
*Attorney, Agent, or Firm*—Donald W. Strickland

[57] ABSTRACT

Apparatus for compensating for the absence of signals among a plurality of correlated signals, which occur simultaneously and which have carrier components, is disclosed herein. Such apparatus comprises detector means responsive to the absence of the carrier for longer than a predetermined time for selectively connecting output signals from channels where the carriers are present to the outputs of those channels where carriers are absent. The apparatus of the invention operates in real time without delay devices. Preferably, the invention is embodied in an apparatus for reproducing magnetically recorded, stereophonic signals, functioning to prevent dropouts from affecting the quality of the output signals and the sound corresponding thereto.

5 Claims, 2 Drawing Figures

DROPOUT COMPENSATION CIRCUITRY

BACKGROUND OF THE INVENTION

The present invention relates to apparatus for translating simultaneously occurring, correlated input signals from one frequency or mode to another. More particularly, this invention relates to improvements in apparatus for compensating for so-called "dropouts" (i.e. temporary loss of one or more input signals) in such signal translation apparatus.

The invention is especially suitable for use in a signal translation apparatus which processes recorded signals having carrier components, and particularly multichannel signals which are stereophonically related.

Dropouts have long been a problem in the reproduction of signals from magnetic records such as magnetic tapes, discs and the like. The loss, due to dropouts, of music for more than a normal pause interval, say 15 milliseconds, or of speech for more than the normal intersyllabic interval, is disturbing to the listener. The problem is most severe when the magnetic record is played back at very slow speeds. The dropout then affects a longer portion of the signal than is the case where the recording is made and reproduced at higher speeds. In an FM system, dropouts having a duration of several carrier cycles will produce bursts of noise each time they occur. In audio systems these dropouts will be manifested by annoying "clicks". Thus, any apparatus for compensating for such dropouts must be responsive to the loss of only a few carrier cycles.

Dropouts and loss of signal during transmission and during the recording and reproducing thereof has received attention in the following U.S. Pat. Nos.: 2,996,576 issued Aug. 15, 1961; 4,076,969 issued Feb. 28, 1978; and Reissue 24, 956 issued Mar. 28, 1961. The dropout compensation scheme proposed in U.S. Pat. No. 2,996,576 involves delaying the signal and substituting the delayed signal for the undelayed signal when a dropout is detected. In the apparatus described in U.S. Pat. No. 4,076,969, the delayed signal to be substituted for the dropout is generated in an inertia circuit, specifically a phase locked loop. In the technique described in U.S. Pat. No. Re. 24,956, special signals are recorded which are less prone to the adverse affect of dropouts, and these special signals are used to compensate the information signals for the effects of the dropouts. Various other forms of dropout and lost signal detectors and compensating techniques similar to those mentioned have also been discussed in the patent literature. See, for instance, the disclosures of U.S. Pat. Nos. 3,328,521; 2,937,368; 3,005,189; 3,071,723; 3,588,705; 3,843,573; 4,035,730; and 4,143,325. The main limitation of these techniques is that they do not take full advantage of the information in the transmission in order to provide compensation for dropouts. Accordingly, compensation is not carried out in real time and with the rapidity necessary to prevent dropouts from being subjectively disturbing to the listener or observer.

SUMMARY OF THE INVENTION

Briefly described, the apparatus of the invention detects signal dropout in a system for translating a plurality of carrier-modulated, simultaneously occurring, correlated input signals into corresponding output signals by continuously monitoring each of the input signals to detect the presence or absence of the carrier component. When the carrier component is detected, thereby indicating a normal condition, the apparatus functions to couple the translated output signals to their normal output terminals. When, however, the carrier component is not detected, thereby indicating a dropout condition in one or more of the input signals, the apparatus functions to temporarily couple the translated output signals corresponding to those input signals which are unaffected by the dropout to the output terminals of those output signals which are affected by the dropout until the dropout has abated. The substitution of one output signal for another, depending upon the presence or absence of a dropout, occurs in real time. The apparatus of the invention also prevents the substitution of one output signal for another when the input signal corresponding to the one output signal is absent. Accordingly, unless an input signal is available in real time, its corresponding output signal is not used to compensate for a loss of a correlated input signal due to a dropout or the like.

The foregoing and other objects and advantages of the invention, as well as the presently preferred embodiment thereof, will become more apparent from a reading of the following detailed description of a preferred embodiment, reference being made to the accompanying drawings.

DETAILED DESCRIPTION OF A PREFERRED EMBODIMENT

Figure 1:
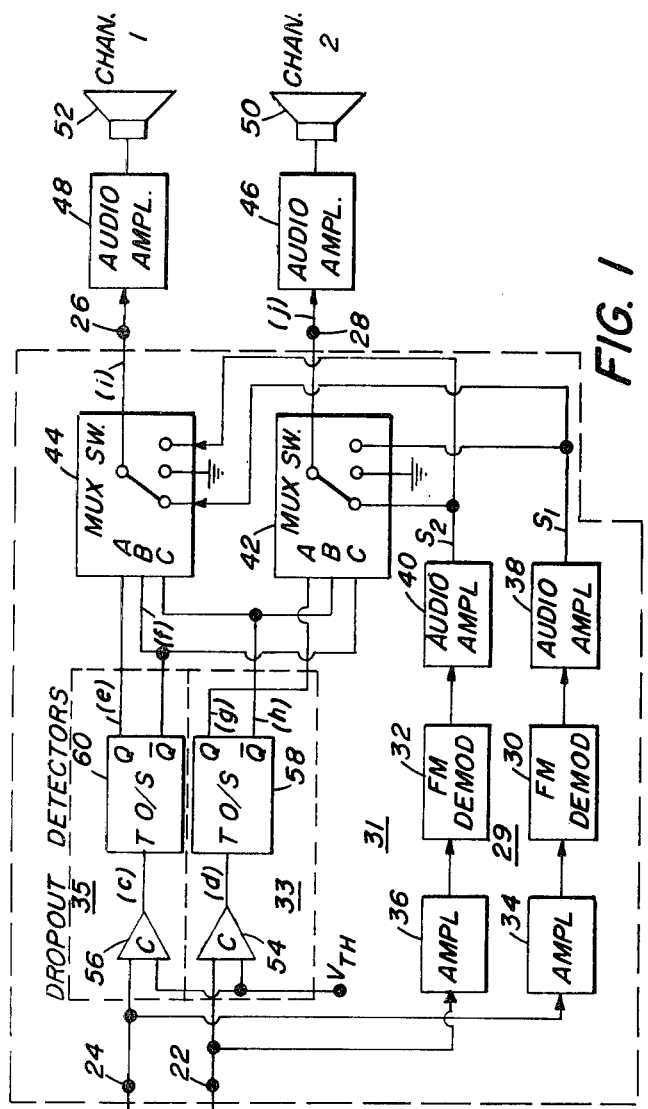
FIG. 1 is a schematic, block diagram of a translation system used for demodulating a plurality of correlated, simultaneously occurring FM signals which are recorded on magnetic tape.

The signal translation apparatus 10 shown in FIG. 1 is designed to process correlated signals in the form of a pair of stereophonic signals simultaneously recorded on a pair of tracks $T_1$ and $T_2$ on a magnetic tape record medium 12. A pair of heads 14 and 16 scan the tracks $T_1$ and $T_2$, and reproduce the signals. The signals contain information, in this case sound (voice or music), modulated on carriers. In this embodiment of the invention, the carriers are modulated in frequency and the signals are FM signals. Other modes of modulation employed may be phase modulation and single sideband when prolonged gaps are not anticipated. The tape is driven at a very slow speed, for example, 1/24 inch per second. Nevertheless, the translation apparatus 10 which incorporates the dropout compensation circuitry of the invention reduces the effects of dropouts in the signals to reasonable levels which are not disturbing to the listener. Some dropouts are illustrated diagramatically in FIG. 1 as the gaps $D_1$ and $D_2$, and $D_3$ and $D_4$ in the tracks $T_1$ and $T_2$, respectively, on the tape 12.

Consider the FM signals obtained by the heads 14 and 16 as they scan the tape 12. These signals are applied to amplifier and equalizer circuits 18 and 20 which may be of conventional design, and appear at the outputs thereof as FM signals. These signals are illustrated in waveforms (a) and (b) of FIG. 2 as frequency modulated sine waves. These waves have gaps 62, 64, 66 and 68 therein due to the dropouts $D_1$, $D_2$, $D_3$ and $D_4$, respectively. By reason of the slow recording and playback speed of the tape 12, these dropouts have durations which are longer than many cycles of the FM carrier at the center frequency thereof. For example, with an FM carrier center frequency of 50 KHz, a hundred cycles have a duration of 2 milliseconds. Waveforms (a) and (b) show the dropouts as being much smaller than 100 cycles of the FM signals, solely in order to simplify the illustration.

The signals from the amplifiers and equalizers 18 and 20 are applied to input terminals 22 and 24 of the signal translation apparatus 10. The apparatus 10 also has output terminals 26 and 28. The signal translation apparatus 10 includes a pair of frequency translation channels 29 and 31 connected to input terminals 24 and 22, respectively. Frequency translation in these channels is accomplished by FM demodulators 30 and 32. High frequency amplifiers 34 and 36 couple the input signals from the input terminals 22 and 24 to these demodulators 30 and 32. Audio amplifiers 38 and 40 couple the demodulated signals, which are translated to audio frequencies, to the output terminals 26 and 28 by way of switching means 42 and 44. These switching means are illustrated as analog multiplex switches (labeled "MUX SW" in the drawing) having analog signal inputs shown at the bottom thereof and control inputs A, B and C. These multiplex switches may be solid state devices which equivalently are single pole triple throw switches, as shown diagramatically in the drawing. Suitable multiplex switches 42 and 44 may be Type 14051 sold by Motorola Semiconductors of Phoenix, Arizona.

The output signals appearing on output terminals 26 and 28 are further amplified in audio amplifiers 46 and 48 which drive loud speakers 50 and 52. The listener hears the stereophonic sound obtained from the tape 12 on speakers 50 and 52.

The signal translation apparatus 10 also includes a pair of dropout detectors 33 and 35, comprising comparators 54 and 56 and one shot (O/S) retriggerable multivibrators 58 and 60 connected to the comparators, as shown. The detectors 33 and 35 are responsive to the FM input signals appearing at the input terminals 22 and 24, respectively. Control outputs in the form of pairs of logic levels from the Q and $\overline{Q}$ outputs of the one shots 59 and 60 represent the presence and absence of the input signals. These levels are applied to the control inputs A, B and C of the multiplex switches 42 and 44. The analog input that is connected to a switch output is determined by the combination of logic levels applied to the A, B and C inputs of the switches 42 and 44.

As shown in FIG. 1, the output signal $S_2$ from frequency translation channel 31 is connected to the output terminal 28. Similarly, the output signal $S_1$ from frequency translation channel 29 is connected to the output terminal 26. The multiplex switches 42 and 44 connect these output signals $S_1$ and $S_2$ to the output terminals 26 and 28, respectively, whenever the dropout detectors 33 and 35 detect the presence of the carrier component of the input signals at both of the input terminals 22 and 24.

When the carrier component of the input signal at terminal 24 is absent, the dropout detector 35 conditions the multiplex switch 44 to connect frequency translation channel 31 to output terminal 26. The output signal $S_2$ then appears at the output terminal 26 and replaces the output signal $S_1$ normally applied to that terminal. Likewise, whenever the carrier component of the input signal at terminal 22 is absent, the dropout detector 33 conditions the multiplex switch 42 to connect frequency translation channel 29 to output terminal 28, thereby replacing output signal $S_2$ with signal $S_1$. If, however, the carrier component is absent from both input signals, it would be undesirable to substitute one output signal for the other. When the carrier component is absent from both input signals, multiplex switches 42 and 44 are conditioned to connect output terminals 28 and 26, respectively, to ground.

Figure 2:
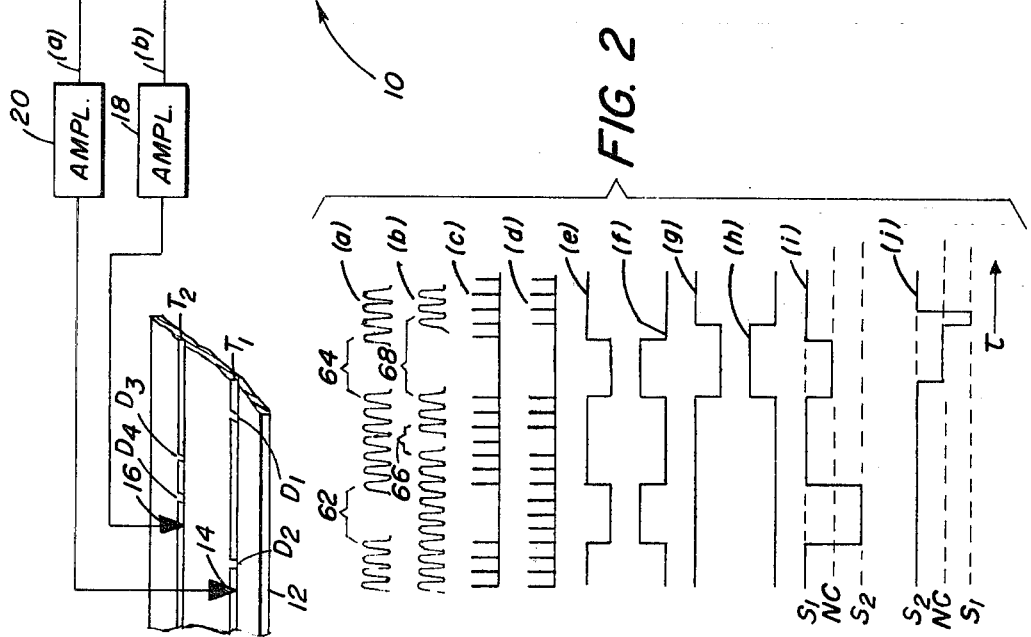
FIG. 2 is a series of waveforms illustrative of signals produced during the operation of the system shown in FIG. 1.

The comparators 54 and 56 of dropout detectors 33 and 35, respectively, provide output pulses when the amplitude of each carrier cycle exceeds a predetermined level indicated as $V_{TH}$. Referring to FIG. 2, waveforms (c) and (d) diagrammatically illustrate these pulses. The pulses appear during each cycle of the carrier component of the input signals when the input signals are present, and are absent when the input signals are lost due, for example, to dropouts. The one shots 58 and 60, once triggered by a pulse, remain triggered for a predetermined period of time. The predetermined time period is chosen to be shorter than the duration of a dropout that would be disturbing to the listener. In the input signal indicated by waveform (a), two such dropouts 62 and 64 occur. The other input signal illustrated by waveform (b) also has two dropouts shown at 66 and 68. The comparator 56 produces a pulse train, the pulses of which successively trigger the one shot 60 except during the periods 62 and 64. Similarly, triggering pulses from the comparator 54 trigger the one shot 58, except during the dropout intervals 66 and 68. The dropout interval 66 is, however, shorter than the reset period of the one shots; accordingly, it is ignored. The one shot 60 changes the respective states of its Q and $\overline{Q}$ outputs during the periods 62 and 64. The one shot 58 changes state only during the dropout period 68. The levels at the Q and $\overline{Q}$ outputs of the one shot 60 representing these changes in states are shown in waveforms (e) and (f) of FIG. 2. Waveforms (g) and (h) shown in FIG. 2 represent the levels at the Q and Q outputs of the one shot 58; they show a change in state only during the dropout interval 68.

The Q and $\overline{Q}$ outputs of the one shot 60 in dropout detector 35 are applied to the A and B control inputs of the multiplex switch 44; the $\overline{Q}$ output of the one shot 58 is applied to the C control input of this switch. Similarly, the Q and $\overline{Q}$ outputs of the one shot 58 are applied to the A and B inputs of multiplex switch 42. The $\overline{Q}$ output of the one shot 60 is applied to the C control input of the multiplex switch 42. The levels of these Q and $\overline{Q}$ outputs control the states of the multiplex switches to apply either signal $S_1$ or $S_2$ or no signal to the output terminals 26 and 28. Waveform (i) of FIG. 2 shows that the output signal $S_2$ replaces the output signal $S_1$ at the output terminal 26 during the dropout interval 62. However, during the dropout interval 64, where the output signal $S_2$ is absent, there is no connection (NC) through the multiplex switch 44 to the output terminal 26. Similarly, it is only during the short period of time at the end of the dropout interval 68 that the $S_1$ output signal replaces the $S_2$ output signal at the terminal 28. When both output signals $S_1$ and $S_2$ are absent, there is also no connection (NC) to the output terminal 28, and the output signals $S_1$, $S_2$ are connected to ground via the switches 42 and 44.

From the foregoing description it will be apparent that there has been provided an improved translation apparatus having means for compensating for the loss of signals where a plurality of carrier modulated input signals which are correlated with each other are simultaneously available. The invention has been described with respect to a pair of stereophonic signals which are highly correlated with one another. Other signals which are correlated with each other, for example, stereophonic signals in four or more channels, may be processed with an apparatus in accordance with the invention to compensate for the loss of signals due to dropouts and the like. The invention was described with respect to magnetic tape apparatus which is but one example of a transmission link which may be subject to loss of signals due to dropouts. The invention is useful with other transmission links such as a radio transmission link which is subject to dropouts from various causes, for example, atmospheric conditions. Further variations and modifications of the herein described apparatus, as well as applications therefor in addition to the illustrated FM stereo signal playback apparatus, will undoubtedly suggest themselves to those skilled in the art. For example, relays of the electromagnetic type may be used instead of the solid state multiplex switches 42 and 44.

The invention has been described in detail with particular reference to certain preferred embodiments thereof, but it will be understood that variations and modifications can be effected within the spirit and scope of the invention.

I claim:

1. In an apparatus for translating a plurality of carrier-modulated, correlated input signals which occur simultaneously at a plurality of input terminals into corresponding output signals at a plurality of output terminals, the improvement comprising:
   (a) means responsive to the carrier components of each of said input signals for continuously providing a plurality of control signals indicating the presence or absence of said input signals; and
   (b) switching means responsive to said control signals and operable in a first state for selectively coupling said output signals to the output terminals therefor while the input signals to which said output signals correspond are present, and operable in a second state for selectively coupling said output signals to the output terminals for other of said output signals during the absence of the input signals to which said other output signals correspond, said apparatus having a plurality of separate translation channels between each of said input and output terminals, one channel for each of said plurality of input signals and the output signal corresponding thereto, said switching means being connected in each of said channels for coupling said output signals to the output terminals therefor, and said means for providing said control signals being a plurality of control circuits separately connected between said input terminals and said switching means, and said control circuits each comprising means for detecting the absence or presence of the carrier component of said input signals for providing a separate one of said control signals, each of said detecting means comprising a comparator responsive to the amplitude of each cycle of the carrier component of the input signal applied thereto, and a one shot multivibrator triggerably connected to said comparator, said one shot multivibrator producing a pair of output levels which provide one of said plurality of control signals and represent the absence and presence of one of said plurality of input signals.

2. The invention as defined in claim 1 wherein said one shot multivibrator of each of said detecting means has a reset period substantially equal to or greater than the duration of a predetermined number of cycles of said carrier components.

3. The invention as defined In claim 1 wherein (a) said channels each include a demodulator for providing a different one of said output signals, said demodulator in each channel being coupled to said switching means therein and to the other switching means in at least another of said plurality of channels, and (b) said control circuits each comprise a comparator responsive to the amplitude of each cycle of the carrier component of the input signal applied thereto, and a one shot multivibrator triggerably connected to said comparator, said one shot producing when triggered a pair of output levels of predetermined duration greater than the duration of a certain number of cycles of said carrier component at a certain frequency thereof which provide two of said plurality of control signals to represent the absence and presence of one of said plurality of input signals in accordance with the relative polarities thereof, said switching means in said channel being an analog multiplex switch having at least three control input and at least one pair of analog input, one of said analog inputs being coupled to the demodulator in the same channel as the switching means therein, and the other of said analog inputs being coupled to the demodulator in another of said plurality of channels, said one shot of the same channel being connected to said switching means therein and with its output levels applied to two of said three control inputs of said analog switch therein, the one shot of said other channel being connected to said analog switch in said other channel with at least one of its output levels applied to the third of said control inputs thereof, whereby output signals corresponding to different correlated input signals replace each other while one of said input signals is present and the others are absent.

4. The invention as defined in claim 3 wherein said magnetic record is scanned at a rate of less than about one inch per second during the reproduction thereof.

5. Dropout compensation apparatus for use in apparatus for translating first and second input signals to corresponding first and second output signals and supplying said first and second output signals to first and second output terminals, said apparatus comprising:
   (a) means for detecting signal dropouts in said first and second input signals and producing a set of control signals in response thereto; and
   (b) switching means responsive to said set of control signals for: (1) connecting said first and second output signals to said first and second output terminals, respectively, when no dropouts are detected; (2) connecting one of said output signals to both of said output terminals when a dropout is detected in the other one of said input signals; and (3) connecting neither of said output signals to said output terminals when dropouts are detected in both of said input signals, said dropout detecting means including a timing means, whereby said dropout detecting means produces control signals indicating a dropout only when said dropout is longer than a predetermined duration.

* * * * *